G. E. SUNDELL.
STEERING MECHANISM.
APPLICATION FILED FEB. 3, 1908. RENEWED FEB. 21, 1910.
953,357.
Patented Mar. 29, 1910.
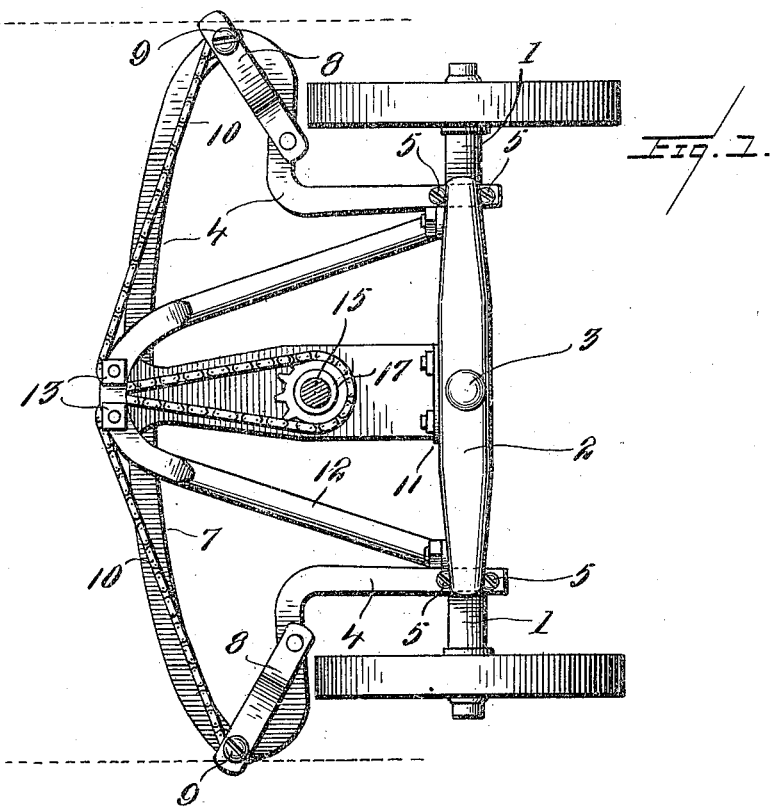
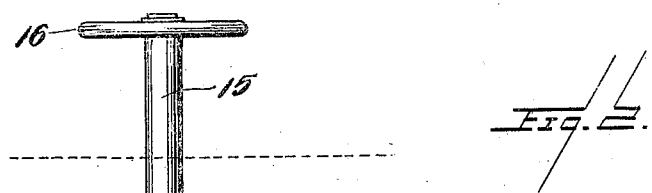
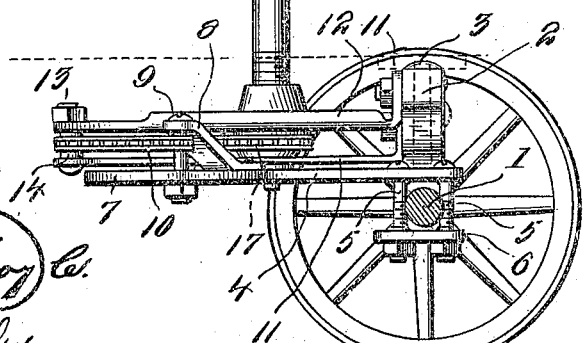
WITNESSES
INVENTOR
Godfrey E. Sundell,
J. Frank S. Appleman, Attorney.

UNITED STATES PATENT OFFICE.

GODFREY E. SUNDELL, OF WARREN, PENNSYLVANIA, ASSIGNOR OF ONE-HALF TO L. H. GREEN, OF WARREN, PENNSYLVANIA.

STEERING MECHANISM.

953,357. Specification of Letters Patent. Patented Mar. 29, 1910.

Application filed February 3, 1908, Serial No. 414,092. Renewed February 21, 1910. Serial No. 545,250.

*To all whom it may concern:*

Be it known that I, GODFREY E. SUNDELL, a citizen of the United States of America, residing at Warren, in the county of Warren and State of Pennsylvania, have invented certain new and useful Improvements in Steering Mechanism, of which the following is a specification.

This invention relates to new and useful improvements in steering mechanism and is intended more especially to be used in conjunction with vehicles that are motor operated.

It is an object of the invention to provide novel means whereby the axle of a vehicle may be turned in the desired direction.

It is also an object of the invention to provide a novel device of this character wherein means are carried by a bolster of the vehicle acting in conjunction with means carried by an axle for turning said axle in the proper direction.

Furthermore, it is an object of the invention to produce a novel device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a top plan view with parts in section; Fig. 2, is a view in side elevation of Fig. 1.

In the drawings 1, denotes an axle and 2, a bolster. The bolster may be secured to any desired form of vehicle body and the axle is held to the bolster by the king-pin 3. Secured to the axle 1, adjacent the wheels thereon are the ends of a sway-bar 4. The method of attaching the ends of the bar 4, may be as desired, but the method illustrated in the drawings is preferred wherein the said ends are clamped to the axle through the medium of the threaded bolts 5, and the under clamping strip 6.

The sway-bar comprises two parallel end portions which project from the segmental body portion 7. Secured to the sides of the sway-bar are the brackets 8, and in these brackets and the ends of the sway-bar are mounted the pins or bolts 9, to which are secured the ends of the sprocket chain 10.

To the bolster 2, is secured a flat bracket 11, which terminates at a point slightly beyond the sway-bar. Also secured to the bolster 2, is a skeleton bracket 12, approximately U-shaped having its free ends held to the bolster. This bracket 12, terminates on a plane with the termination of the bracket 11, and mounted in the brackets 11 and 12, at the ends thereof, are the parallel studs or shafts 13, on which loosely revolve between the brackets 11 and 12, the rollers 14; the said shafts and rollers acting as guiding members for the sprocket chain.

Approximately centrally of the length of the bracket 11, is mounted a vertical shaft 15, which projects through the flooring of the vehicle body and has secured to its upper end an operating wheel 16, as it is thought will be fully appreciated. Mounted on the shaft 15, adjacent the bracket 10, is a sprocket wheel 17. The sprocket chain 10, passes in between the rollers 14, and around the sprocket wheel 17. It is thought that it will be readily understood how the turning of the shaft 15, in either direction will impart the desired movement to the axle 1, on the king-pin 3.

The manner of rotating the sprocket wheel 17, illustrated in the drawings forms no essential feature of the invention as any method will suffice which will successfully meet the requirements of practice as for instance a shaft provided with a worm meshing with the sprocket, this feature being so well known it is not illustrated in the drawings, as it is thought that such illustration is unnecessary.

I claim:

1. In combination with a vehicle truck, a sway bar extending away from and transversely of its axle, a bracket projecting from the truck, a second bracket extending outwardly and transversely of the truck and passing across the first mentioned bracket, guiding members connecting the brackets near their outer extremities, a rotary member stationed between the outer extremities of the brackets and the truck, and a flexible device connected to two sides of the sway bar and in engagement with the guiding members, the said flexible device being connected to the rotary member and adapted to take motion therefrom.

2. In a steering mechanism, a vehicle truck having a sway bar extending away from and transversely of the truck, a bracket extending from the truck in the direction of the sway bar, a second bracket having two of its ends anchored to the truck and its outwardly curved portion extending over the end of the first mentioned bracket, a rotary member, a flexible device run over the rotary member, guiding devices extending between the brackets at the outer portions thereof for engaging the flexible device, and means for connecting the ends of the flexible device to opposite sides of the sway bar.

3. In a steering mechanism, a truck, a bracket projecting therefrom, a second bracket having two ends anchored to the truck and forming a brace, devices connecting the brackets, a flexible member engaging the bracket connecting means, a rotary member engaging the flexible member, means for rotating the rotary member, and means whereby the ends of the flexible member are anchored to communicate motion to the axle of the truck.

In testimony whereof I affix my signature in the presence of two witnesses this 25th day of January, 1908.

GODFREY E. SUNDELL.

Witnesses:
    NELLIE B. SMITH,
    E. G. BLODGETT.